(12) United States Patent
Kercher et al.

(10) Patent No.: US 10,287,210 B2
(45) Date of Patent: May 14, 2019

(54) PRODUCTION OF PELLETS

(71) Applicant: Kercher Enterprises, Inc., Lebanon, PA (US)

(72) Inventors: Edwin C. Kercher, Lebanon, PA (US); Michael A. DiNovo, Lebanon, PA (US); Joshua S. Long, New Providence, PA (US)

(73) Assignee: KERCHER ENTERPRISES, INC., Lebanon, PA (US)

( * ) Notice: Subject to any disclaimer, the term of this patent is extended or adjusted under 35 U.S.C. 154(b) by 40 days.

(21) Appl. No.: 14/961,085

(22) Filed: Dec. 7, 2015

(65) Prior Publication Data

US 2016/0159691 A1 Jun. 9, 2016

Related U.S. Application Data

(60) Provisional application No. 62/088,157, filed on Dec. 5, 2014, provisional application No. 62/169,916, filed on Jun. 2, 2015, provisional application No. 62/171,745, filed on Jun. 5, 2015.

(51) Int. Cl.

| C04B 26/28 | (2006.01) |
|---|---|
| C04B 11/26 | (2006.01) |
| C05G 3/00 | (2006.01) |
| C04B 18/02 | (2006.01) |
| B01F 7/16 | (2006.01) |
| B01F 9/12 | (2006.01) |
| C05D 3/00 | (2006.01) |

(52) U.S. Cl.
CPC ............ *C04B 26/28* (2013.01); *B01F 7/1665* (2013.01); *B01F 9/125* (2013.01); *C04B 11/268* (2013.01); *C04B 18/022* (2013.01); *C05D 3/00* (2013.01); *C05G 3/0058* (2013.01); *Y02W 30/92* (2015.05); *Y02W 30/95* (2015.05)

(58) Field of Classification Search
CPC ..... C04B 26/28; C04B 11/268; C04B 18/022; B01F 7/1665; B01F 9/125; C05D 3/00; C05G 3/0058; Y02W 30/92; Y02W 30/95
USPC ........................................................ 428/402
See application file for complete search history.

(56) References Cited

U.S. PATENT DOCUMENTS

| 3,956,456 A | 5/1976 | Keller et al. | |
|---|---|---|---|
| 4,015,972 A * | 4/1977 | Watkins | C05D 3/00 |
| | | | 106/773 |
| 4,028,088 A * | 6/1977 | Young | C05C 1/00 |
| | | | 423/396 |
| 4,183,763 A | 1/1980 | Omilinsky et al. | |
| 4,954,134 A * | 9/1990 | Harrison | B01J 2/28 |
| | | | 106/773 |
| 5,008,055 A | 4/1991 | Holley | |
| 5,078,779 A * | 1/1992 | Van de Walle | B01J 2/28 |
| | | | 106/600 |
| 5,173,232 A | 12/1992 | Holley | |
| 5,362,471 A | 11/1994 | Roth et al. | |
| 5,516,976 A | 5/1996 | Smith et al. | |
| 6,413,291 B1 | 7/2002 | Wommack et al. | |
| 6,471,767 B1 | 10/2002 | Konczak | |
| 2001/0029762 A1* | 10/2001 | Steele | B01J 20/28004 |
| | | | 71/63 |
| 2006/0180090 A1* | 8/2006 | Odom, Jr. | A01N 25/08 |
| | | | 119/171 |
| 2006/0180091 A1* | 8/2006 | Odom, Jr. | A01N 25/08 |
| | | | 119/171 |
| 2007/0169709 A1 | 7/2007 | Wang et al. | |
| 2007/0169710 A1 | 7/2007 | Wang et al. | |
| 2007/0175403 A1 | 8/2007 | Wang et al. | |
| 2013/0125586 A1 | 5/2013 | Koseski et al. | |
| 2014/0294703 A1 | 10/2014 | Ozaki et al. | |
| 2015/0027181 A1 | 1/2015 | Ginn et al. | |
| 2016/0115563 A1 | 4/2016 | Kotiranta et al. | |
| 2016/0122248 A1 | 5/2016 | Jansen et al. | |

FOREIGN PATENT DOCUMENTS

WO 2014/026048 A2 2/2014

OTHER PUBLICATIONS

U.S. Appl. No. 13/962,903: Non-final office action dated Feb. 14, 2014, 7 pages.
U.S. Appl. No. 13/962,903: Final office action dated Aug. 6, 2014, 6 pages.
U.S. Appl. No. 13/962,903: Non-final office action dated Feb. 20, 2015, 6 pages.
U.S. Appl. No. 13/962,903: Non-final office action dated Sep. 2, 2015, 5 pages.

* cited by examiner

*Primary Examiner* — Leszek B Kiliman
(74) *Attorney, Agent, or Firm* — Graham Casanova Alig; Alig Patent Law

(57) ABSTRACT

A process for manufacturing pellets includes providing a first supply of a first material and a second supply of a binder including a second material in respective storage units. The first supply of the first material is mixed in a counter-current mixer with the second supply of the binder and water to produce a plurality of pellets. The mixing occurs simultaneously with pelletizing in the mixer. The plurality of pellets are discharged from the mixer.

20 Claims, 7 Drawing Sheets

PRODUCTION OF PELLETS

CROSS-REFERENCE TO RELATED APPLICATION

This application claims priority under 35 U.S.C. § 119(e) from U.S. Provisional Application Ser. No. 62/088,157 filed Dec. 5, 2014, U.S. Provisional Application Ser. No. 62/169,916 filed Jun. 2, 2015, and U.S. Provisional Application Ser. No. 62/171,745 filed Jun. 5, 2015, the entirety of each of which is hereby incorporated by reference herein.

BACKGROUND

Synthetic gypsum is a material resulting from removal of sulfur oxides ($SO_x$) from a coal-fired boiler's discharge flue gas stream. In a process known as scrubbing, sulfur oxides such as sulfur dioxide ($SO_2$) and/or sulfur trioxide ($SO_3$) are removed from flue gases by injecting a fine calcium powder, limestone, into the flue gas stream emitted from the boiler. The result of the scrubbing process is synthetic gypsum ($CaSO_4$). Synthetic gypsum, also referred to as syngyp, is beneficially used in agricultural applications, e.g., as a fertilizer. In dried powder form, relatively small quantities of synthetic gypsum can be applied directly to soil. But, the fine powder easily becomes airborne during distribution and requires careful, professional, application. Therefore, improved techniques for producing synthetic gypsum pellets are desirable, because pellets are easier to handle and apply than a fine powder.

SUMMARY

In some embodiments of the present disclosure, a process for manufacturing pellets includes providing a first supply of a first material and a second supply of a binder including a second material in respective storage units. The first supply of the first material is mixed in a counter-current mixer with the second supply of the binder and water to produce a plurality of pellets. The mixing occurs simultaneously with pelletizing in the mixer. The plurality of pellets are discharged from the mixer.

In some embodiments, a pellet comprises synthetic gypsum, corn starch, and water. The pellet is round, and the mass of the corn starch in the pellet is less than 4% (in some examples, less than 2% or less than 1%) of the mass of the synthetic gypsum in the pellet.

In some embodiments, a pelletization system comprises a first bin, a second bin, a counter-current mixer, and a controller. The first bin contains a first supply of synthetic gypsum. The second bin contains a second supply of a binder including corn starch. The counter-current mixer is configured to mix the first supply of synthetic gypsum, the second supply of the binder, and water. The controller is configured to control the flow of water to the mixer.

BRIEF DESCRIPTION OF THE DRAWINGS

The following will be apparent from elements of the figures, which are provided for illustrative purposes and are not necessarily to scale.

DETAILED DESCRIPTION

This description of the exemplary embodiments is intended to be read in connection with the accompanying drawings, which are to be considered part of the entire written description.

Figure 1:
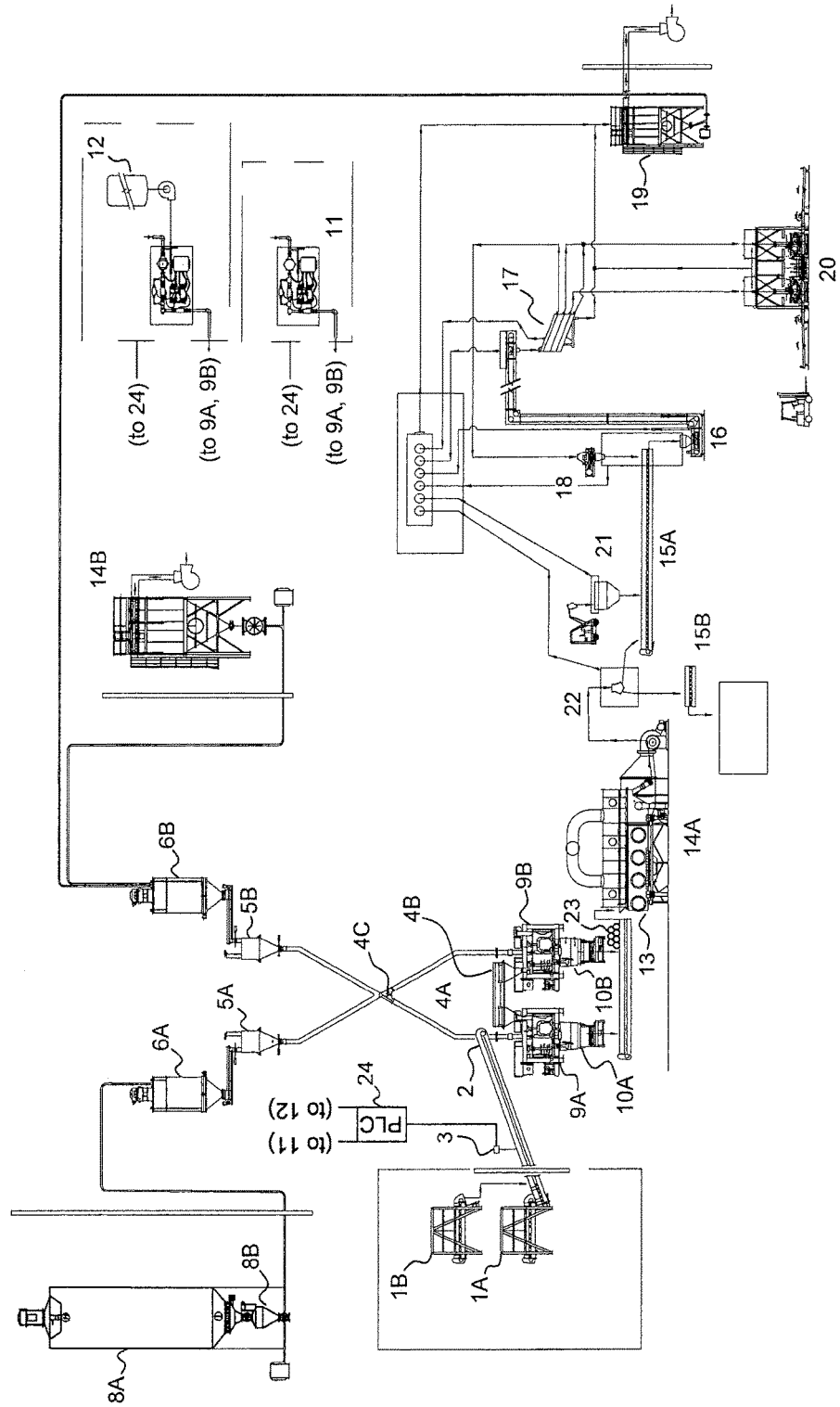
FIG. 1 is a system diagram showing various processing components associated with the pelletization of synthetic gypsum or another material in accordance with some embodiments.

FIG. 1 is a system diagram showing various processing components associated with the pelletization of synthetic gypsum in accordance with some embodiments. One of the components, mixer 9 which is representative of mixers 9A and 9B, is shown in greater detail in FIG. 2. FIGS. 3-6 present magnified views of sections of FIG. 1. The overall end-to-end process corresponding to FIG. 1 can operate continuously with material delivery to any of the two mixing machines 9A, 9B which generate a "ready" signal when a mixer is determined to be empty based on an elapsed discharge time period. In some embodiments, the process starts by depressing a main controller "start" button or icon on a human-machine interface. All system components will start in sequence from process output to process input. In some embodiments, the process will stop by a human pressing a "stop" button or icon which will be followed by an orderly shutdown where all system components are stopped in direction of system input to system output. If immediate shut down is required (e.g., an emergency condition), an emergency stop push button may be pressed.

A brief overview of a typical operating sequence is now described, followed by a details of various components along the processing chain. Synthetic gypsum is metered at bulk and dribble rates on to a weigh conveyor 2 and directed into one of two mixing machines 9A, 9B (collectively referred to as mixer 9). Minor ingredients such as binder and recycled fine particles/dust are batched in their respective weigh hopper 5A or 5B. Minor ingredients are transferred to the loading mixing machine 9 by operation of weigh hopper discharge gates, which result in depositing the minor ingredients into the lower portion of a mixer charging manifold 4B. Water is introduced into mixing machine 9 with the amount adjusted in accordance with measured moisture content of the synthetic gypsum materials. The pelletized product will be determined to have been completely discharged from the active mixing machine 9 based on confirmation that sufficient receptive volume exists in the table feeder hopper (10A or 10B, corresponding to mixers 9A and 9B) and a preset mixer discharge time period has elapsed. At this time the mixing machine discharge gate will close and the process path will produce a "ready" signal to initiate receipt of the next batch of raw materials. Pelletized product in the table feeder hopper 10A or 10B is dispensed onto dryer feed weigh belt 13 at a rate set by the table feeder motor speed and manual set position of the discharge gate. The pellet dryer discharges into a pellet cooler (dryer/cooler collectively labeled 14A) with its output conveyed in-to a pellet sizing screener 17 via a bucket elevator 16. The screening process will direct specification-sized segments of the batch to bulk bag loaders or out-of-specification-sized product to a crumbler mill 18 for size reduction. The output of crumbler mill 18 is redirected to the screener 17 for separation of in-specification sized-product to be loaded into a bulk bag. Fine particles, identified as dust and other small out-of-specification product are directed to a recycle bin 6B for reintroduction into the mixing process as a component of the minor ingredient materials.

Various components shown in FIG. 1 are now described in detail. Raw synthetic gypsum (syngyp) is stored in infeed surge hoppers 1A, 1B. Surge hoppers 1A, 1B may be fabricated with carbon steel, and any number of surge hoppers may be used. Discharge from the hoppers is accomplished via a live-bottom discharge system formed by a grid of transverse running screw conveyors. Syngyp is fed from surge hoppers 1A, 1B onto an inclined weigh-belt conveyor assembly 2. A belt conveyor of assembly 2 may be inclined to move material from infeed surge hoppers 1A, 1B to a pivoting infeed belt conveyor 4A. Conveyor weigh system 2 is then used to determine the weight of the material feeding into mixers 9. The weight scale signal is fed into a programmable logic controller (PLC) 24. PLC 24 and any other PLCs used in various embodiments may be implemented in hardware, firmware, or software encoded (e.g., as instructions executable by a processor) on a non-transitory computer-readable storage medium.

A moisture meter 3 on the belt conveyor of assembly 2 measures moisture of the syngyp and transmits a signal representing the measurement to PLC 24, where that signal will be used to calculate the appropriate amount of water to add to an individual batch for mixing.

Pivoting infeed belt conveyor 4A pivots near the discharge point of conveyor assembly 2. In some embodiments using multiple mixers (e.g., mixers 9A and 9B as shown in FIG. 1), conveyor 4A pivots to a selected mixer infeed position of mixer charging manifold 4B as determined by a PLC (PLC 24 or a different PLC). Conveyor 4A then discharges the syngyp material into the selected mixer (9A or 9B). Mixer charging manifold 4B spans between mixers 9A and 9B. Internally, manifold 5B is divided into two ports that deliver material into the respective mixers 9A, 9B. The discharge end of pivoting infeed conveyor 4A is positioned within manifold 4B and sequences the delivery of syngyp material between mixers 9A and 9B.

Weigh bin 5A receives a binder from day bin 6A, and weigh bin 5B receives recycled fine particles/dust from day bin 6B. The weigh bins may also be referred to as weigh hoppers. Fine particles (referred to as fines for short) and dust are discussed further below in the context of dust collection system 19 and dryer dust collection system 14B. The binder and recycled fines/dust are metered into weigh bins 5A, 5B using metering screw feeder assemblies. The metering screws are controlled by the system PLC (e.g., PLC 24 or a different PLC) using the batch formula set in the PLC and the bulk and dribble modes of conveyance determined by the PLC. By using bulk and dribble modes, the water can be precisely dispensed into mixers 9A, 9B. Weigh bins 5A, 5B fill during the operation of mixers 9A, 9B. Weigh bins 5A, 5B then refill mixers 9A, 9B once pelletized material has been discharged from the mixers. A diverter 4C is used to direct the binder and/or fines/dust to an individual mixer (9A or 9B). Each weigh bin 5A, 5B has a passive filter vent for dust control. This filter purges itself into the respective weigh bin (5A or 5B) prior to each batching cycle.

A day bin 6A for storing binder and a day bin 6B for storing recycled fines/dust may be designed with a 200 ft$^3$ capacity to receive materials. Bins 6A, 6B may include vibratory bin bottoms to assist in material discharge flow. Binder day bin 6A receives material from a binder silo 8A. The fines and dust are received from general dusty baghouse 19 and dryer dust baghouse 14B. Bins 6A, 6B may be made of carbon steel and may have bin vent filters for dust control. Day bins 6A, 6B each have a gate valve installed at the bin discharge points for maintenance purposes. Both bins 6A, 6B have both high and low level bin level indicators, which communicate with the PLC (PLC 24 or a different PLC). The low level indicates a warning to the PLC of material availability, and the high level indicates that the bin is full and cannot accept more material. In some embodiments a third day bin 6C stores an optional third ingredient (e.g., sulfur, potash, cement kiln dust) which may provide for altering pellet characteristics or adding fertilizer value, or any number of additional bins may be used for storing optional additional ingredients to be mixed.

The binder and recycle fines/dust materials are metered into their respective weigh hoppers 5A, 5B through enclosed metering screw feeders 7. Each feeder 7 has a positive cut off valve at its discharge into the weigh bin (5A or 5B).

A truck unloading and binder silo system is used to unload binder material into storage silo 8A via pneumatic bulk truck. There is a vibratory live bottom bin attached to silo 8A. Material discharges through the live bottom bin into a rotary valve and then into an isolation hopper 8B. This hopper 8B discharges into another rotary valve, which feeds a pneumatic charging conveying line to binder day bin 6A. The system of live bottom bin, bin discharge rotary feeder, surge hopper and rotary valve line feeder is being used to ensure constant discharge flow of the fine clay powder that may be used as binder in some embodiments, and to eliminate any atmospheric air being introduced into the bottom of the silo 8A.

Figure 2:
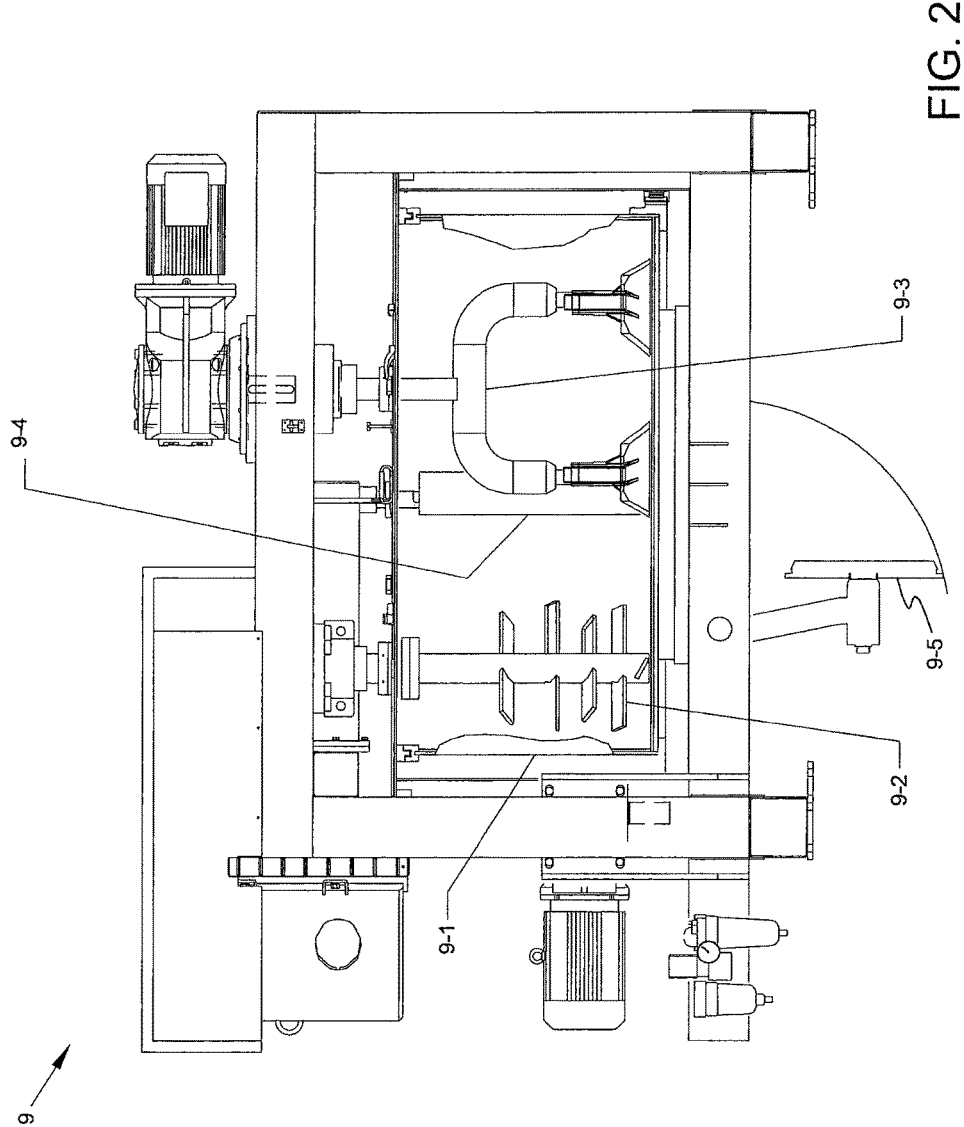
FIG. 2 is a diagram of a mixer used in accordance with some embodiments for producing pellets containing synthetic gypsum or another material.
Figure 3:
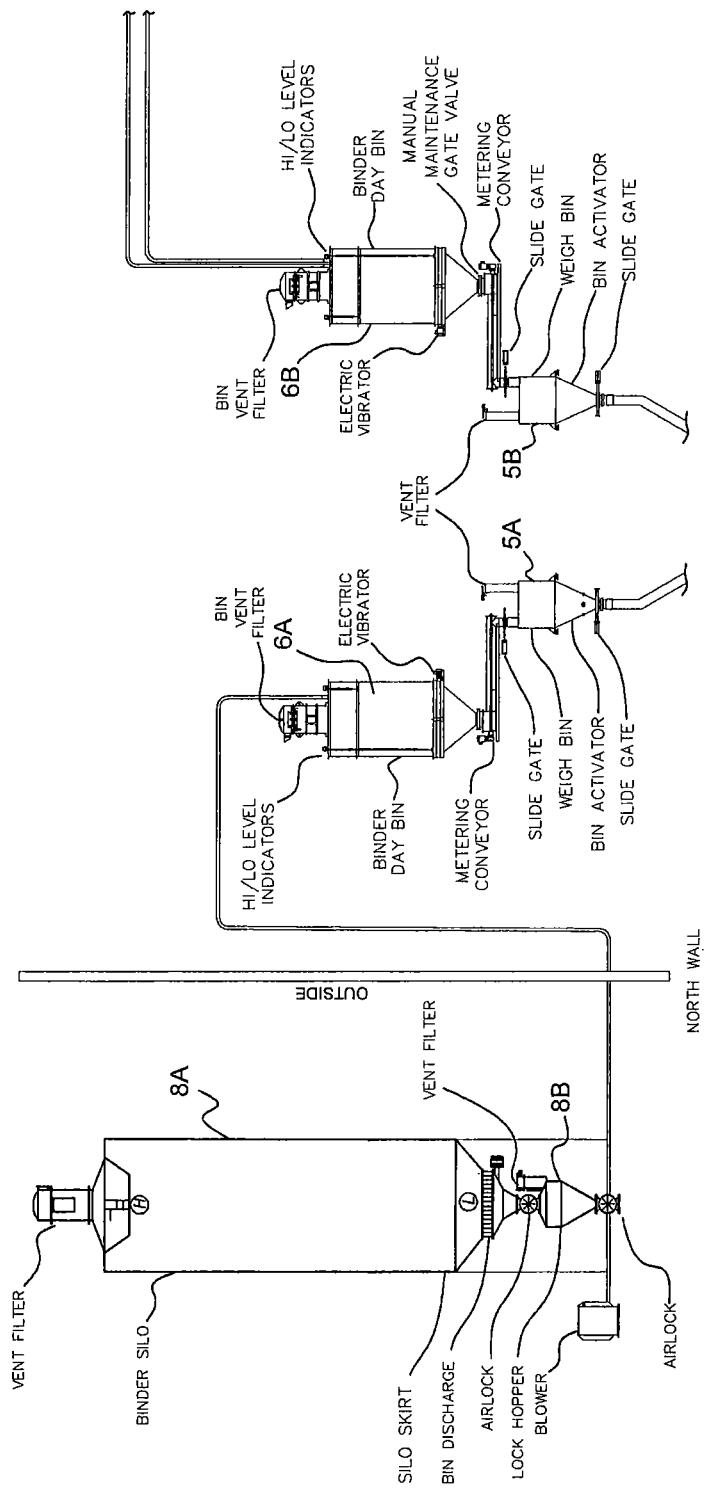
FIG. 3 is a diagram showing a magnified view of a portion of FIG. 1.
Figure 4:
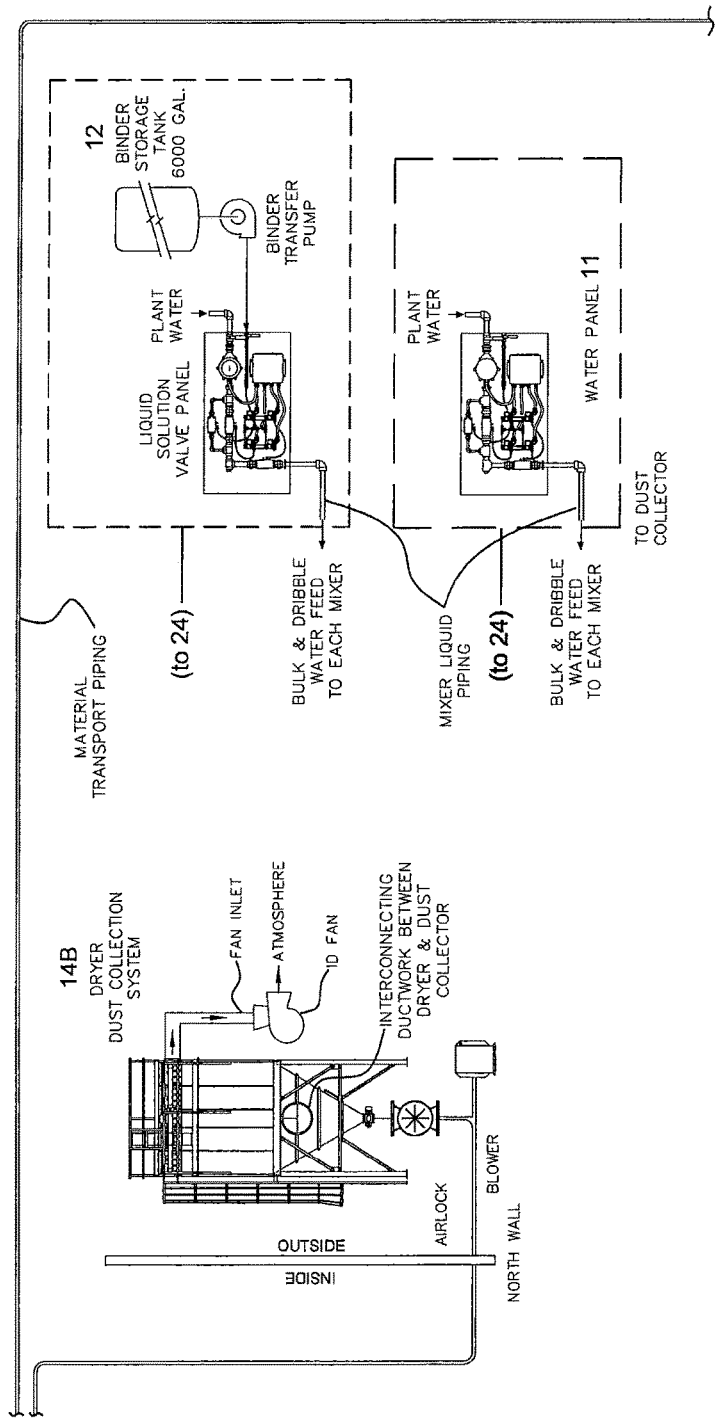
FIG. 4 is a diagram showing a magnified view of a portion of FIG. 1.
Figure 5:
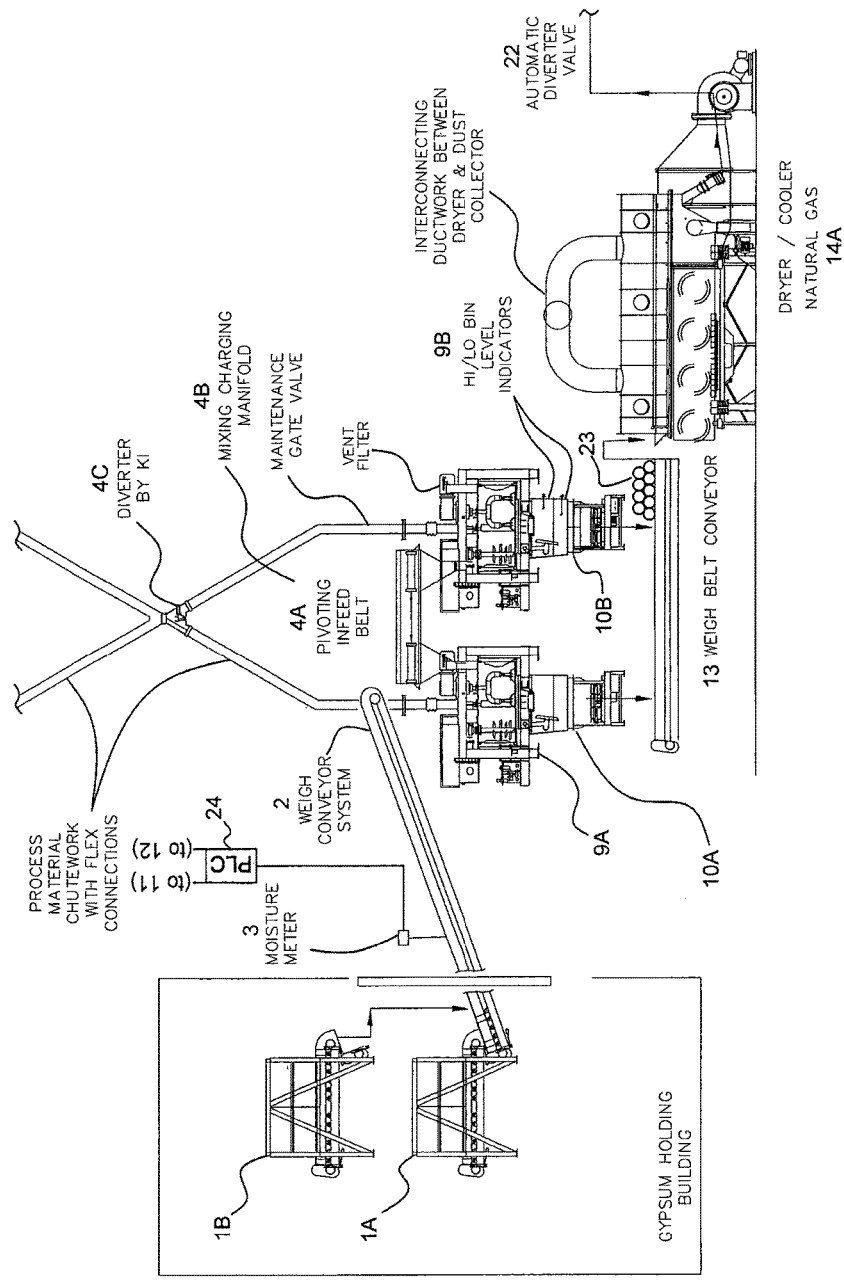
FIG. 5 is a diagram showing a magnified view of a portion of FIG. 1.
Figure 6:
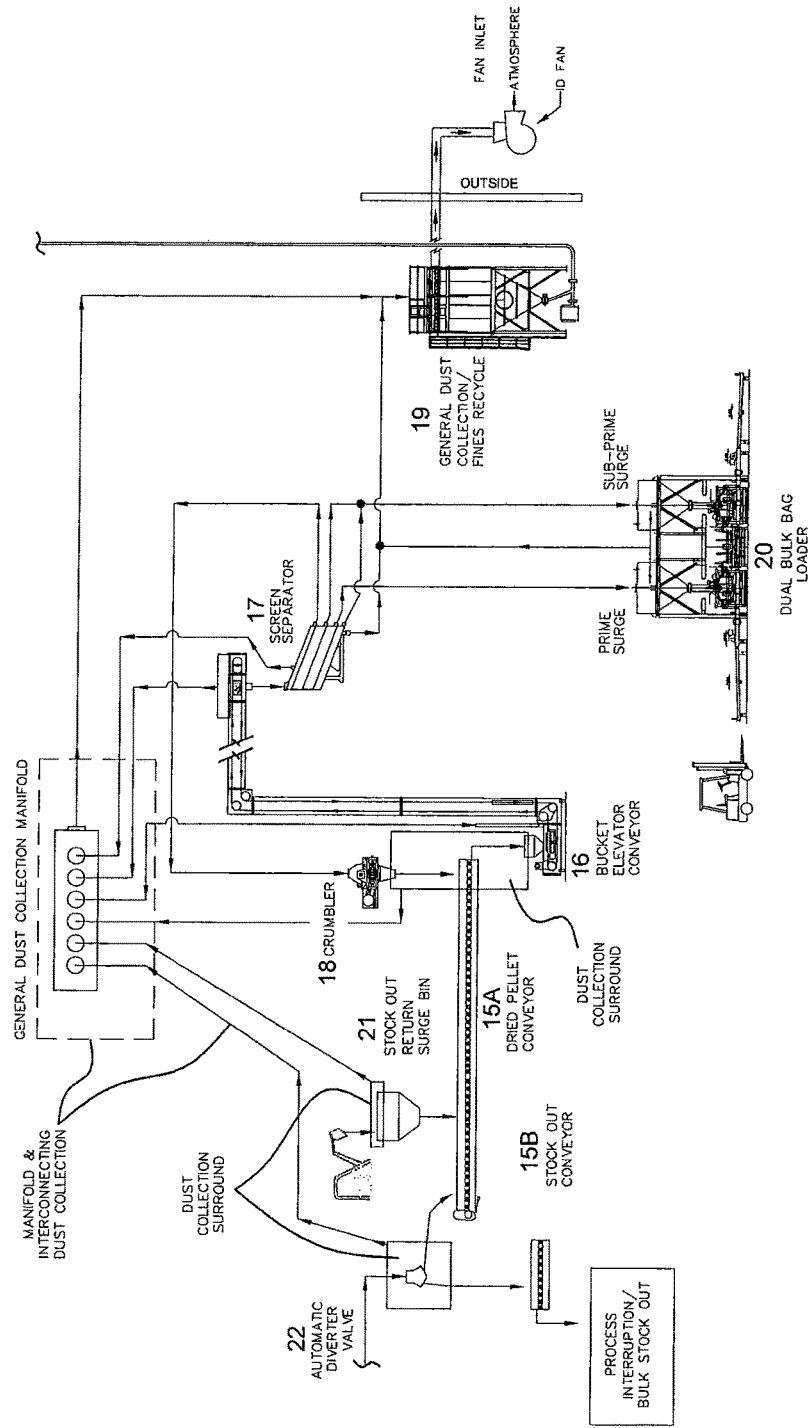
FIG. 6 is a diagram showing a magnified view of a portion of FIG. 1.

FIG. 2 is a diagram of a mixer used in accordance with some embodiments for producing synthetic gypsum pellets. Multiple instances of mixer 9 shown in FIG. 2 may be used, e.g., as shown by mixers 9A and 9B in FIG. 1, each of which may have the internal configuration of mixer 9. Mixer 9 is a high-intensity mixer that is available from Kercher Industries, Inc., in Lebanon, Pa. In some embodiments, mixer 9 has a working capacity of 45 ft$^3$. Mixer 9 includes a rotating mixing pan 9-1 within which materials including synthetic gypsum, binder, and water may be mixed. In some embodiments, mixing pan 9-1 is turned through a pinion on a 15 HP SEW gear-drive, and a high speed mixing rotor 9-2 is powered through a belt system by a 100 HP motor. One of ordinary skill in the art recognizes that various motor specifications and configurations can be used, and examples described herein are non-limiting. An optional low speed plow 9-3 prevents material buildup on the pan bottom and aids in mixing and discharge in some embodiments.

Plow 9-3 is powered by a 15 HP SEW gear-drive. Rotor 9-2 and plow 9-3 rotate in a first rotational direction (e.g., counter-clockwise), while pan 9-1 rotates in a second rotational direction (e.g., clockwise), thus producing counter-current mixing action so that mixer 9 is a counter-current mixer. This combination of mixing tooling and rotating pan is primarily responsible for the ability to thoroughly mix and pelletize simultaneously in a short cycle time (e.g., under 8 minutes) with a single machine. Whereas other processes require separate operations for mixing and pelletizing, in embodiments of the present disclosure mixing and pelletizing occur simultaneously in a single operation.

Mixers 9A, 9B are charged with gypsum from pivoting infeed conveyor 4A as well as binder and recycled fines/dust from weigh bins 5A, 5B. The gypsum fed into mixers 9A and 9B is normally wet gypsum, which may be provided directly as a result of the scrubbing process that produces synthetic gypsum. Gypsum powder typically becomes wet at about 6% moisture content, and at about 20% moisture the material turns to a slurry. If the gypsum is too wet to pelletize properly, an additional dry material can be added at the start of the mixing process. With the use of wet gypsum for mixing, there is no need to first dry the gypsum as in other processes, which would consume substantial energy and would require more water to be added later for pelletization. Thus, cost and time savings are achieved with the use of wet gypsum in various embodiments. The use of high-intensity, counter-current mixers 9A and 9B enables the resulting mixture to be homogeneous. Water is provided to mixers 9A, 9B from a water source (e.g., plant water supply) and is controlled and metered by the a water panel 11 which provides all of the piping, valves, and metering equipment necessary for adding batch water. The amount of water that is added to each mixing batch is less than would be needed if an initial drying operation were performed on the gypsum prior to mixing as in other processes. In other embodiments, dry gypsum provided to mixers 9A and 9B for mixing.

In some embodiments, the binder fed into mixers 9A and 9B include corn starch. Corn starch binder helps pelletization and helps form hard pellets, which minimizes the chance of the pellets disintegrating during handling while retaining the capability of the pellets to dissolve in an appropriate time after field application on the ground. In some embodiments, small quantities of starch binder are used in each batch, e.g., less than 4% of the mass of the gypsum being mixed in the batch. In some embodiments, the mass of the binder is less than 2% or less than 1% of the mass of the gypsum. Without high intensity counter-current mixing provided by mixers 9A and 9B, it would not be practical to disperse such a small quantity of binder for successful pelletization. The use of corn starch binder yields pellets that are light (e.g., white) in color. In other embodiments, the binder includes cement kiln dust or lignosulfanate, both of which yield a harder pellet than corn starch binder.

Each mixer 9A, 9B has a pellet batch time of less than 8 minutes in some embodiments. Once the batch has been completed, the discharge gate on the mixer is opened and pelletized material is discharged from the mixer via discharge valve 9-5 using mixer plow 9-3. The pelletized material from a mixers 9A, 9B drops from the mixer into the respective table feeder with surge hopper 10A, 10B. When the material has discharged, the discharge gate closes. Once the discharge gate is closed the batching process may begin again.

Mixer 9 has a nominal working capacity of 45 cubic feet or 4500 lbs. @ 100 lbs./ft$^3$ in some embodiments. Actual capacities may vary depending upon specific applications. Access to the inside of mixer 9 is gained through hinged, as well as removable, openings in the top of mixer 9. These openings avert the possibility of leakage and pan deformation associated with an opening in the side of the mixing pan 9-1.

Mixing rotor 9-2 is the primary mixing tool. In some embodiments, rotor 9-2 is driven by a single speed 100 HP, 1750 RPM, 230/460 VAC, 60 HZ, 3-phase, variable frequency drive (VFD), totally enclosed fan cooled (TEFC) motor. Multiple "V"-belts couple the drive motor to the mixing rotor spindle shaft. A 15 HP SEW Eurodrive, 230/460 VAC, 60 HZ, 3 PH, gear-motor may drive plow 9-3. Plow, 9-3 aids in mixing and cleans the mixing pan bottom and also facilitates a quick discharge of the pelletized materials from mixing pan 9-1.

A stationary, adjustable and wear-resistant mixing pan side wall scraper blade 9-4 continually cleans the pan sidewall uniformly from top to bottom. Mixing pan side wall scraper 9-4 also cleans the outside edge of the bottom of mixing pan 9-1 and directs pelletized materials into the path of mixing plow 9-3.

The rotating mixing pan 9-1 may be approximately 72" deep×30" high. Mixing pan 9-1 is supported by a massive ball bearing. A gear ring drives mixing pan 9-1 and forms a rigid corner base for the bottom and sidewall of mixing pan 9-1. Additionally, this gear ring provides not only a low maintenance, positive drive to mixing pan 9-1, but it also helps maintain pan concentricity throughout the life of mixer 9. The gear ring pinion may be driven by a 15 HP SEW Eurodrive, 230/460 VAC, 60 HZ, 3 PH, VFD gear-motor.

Mixing pan 9-1 is lined on the bottom and sidewalls with replaceable wear liners. The sideliners extend from the bottom of the machined side wall of mixing pan 9-1 to the bottom edge of the low profile labyrinth dust seal ring. This total side wall coverage minimizes areas where material can be trapped. The machined mixing pan side wall facilitates uniform contact with the side wall scraper blade 9-4.

The amount of time for mixing/pelletizing within mixer 9 depends on the raw material that is used (e.g., gypsum). In some embodiments, gypsum is mixed with minor ingredients (e.g., binder and recycled fines/dust) and water in mixer 9 for less than 8 minutes to produce gypsum pellets.

Discharge of pellets is accomplished through a centrally located, pneumatically operated, pivoting bottom discharge valve 9-5. When discharge valve 9-5 is opened, it is pivoted clear of the discharge opening, allowing the pelletized material to flow free of any obstruction. All control solenoid valves are mounted to mixer 9.

Mixing pan 9-1 may be totally enclosed on the top and sides by a removable stationary cover and side skirt. This flat cover is sealed against the top and inside of mixing pan 9-1. The cover has no protrusions into the mixing pan area. The flat surface allows for easy cleaning. The top of the cover contains vent openings, charging openings and sealed, hinged, and removable access openings. These openings may vary depending upon specific applications. Safety switches are supplied for all access openings.

The dust seal between the rotating pan wall and the stationary mixing pan cover is accomplished by a large, precision-machined labyrinth seal ring set. An additional overlapping inner flap seal covers the labyrinth seal ring set. The shaft of primary mixing rotor 9-2 and the shaft of secondary mixing plow 9-3 are sealed with a double lip seal configuration having a machined grease cavity between the double seals. The support shaft of stationary mixing pan side wall scraper 9-4 is sealed with a single lip seal configuration. These precision seals minimize the dust emissions often associated with high intensity mixing.

An automatic lubrication system may be installed during the assembly of mixer 9. This compressed air driven automatic lubrication system features the following devices and their associated functions: One pump package with grease reservoir, air operated pump, air solenoid valve, low level switch, pressure gauge, etc.; one controller to time sequence and monitor the lubrication sequence w/lube fault sensing; one master distributor with cycle switch and memory reset indicators; one set of secondary and distributors provide controlled quantities of lubricants to all points.

Referring back to FIG. 1, table feeder surge hoppers 10A, 10B are directly connected to the bottom of respective mixers 9A, 9B and may be fabricated with carbon steel. In some embodiments, each table feeder surger hopper 10A, 10B has a working capacity of 65 ft$^3$ and is 60 inches in diameter with a sloped side wall. The sloped side wall of the cone is constantly scrapped by the side wall scraper. This scraper, in conjunction with vertical pins attached to the rotating table, provides for constant and even flow from the table feeder. The working capacity is designed to hold 1.5 batches of material from mixer 9A, 9B. The transition cylinder over the table is used as a surge hopper to temporarily store 1.5 material batch volumes while the table feeder continuously discharges the pelletized material.

The rotary table feeder includes a transition cylinder, a rotating table, discharge plow, a drive mechanism, and a support structure. The table feeder uses a large flat rotating table to continually bring material from the transition cylinder to the discharge plow. The table feeder may be driven by a 20 HP, inverter duty SEW-Eurodrive gear motor, 230/460 VAC, 60 HZ, 3 PH. The table has vertical pins attached inside the transition cylinder area. As the table turns, the blade and pins agitate the material and keep it evenly flowing to the discharge plows. An adjustable UHMW band rides on the outer surface of the table to prevent material from exiting the table feeder outside the discharge area. The discharge plow is used to bring the material to fixed point as it leaves the table.

Water panel 11 may uses plant service water. Depending on the gypsum moisture identified by moisture meter 3, water panel 11 regulates and meters to automatically provide the correct amount of additional water determined by PLC 24 for each individual batch. Water panel 11 has two distinct water piping, valving and measuring paths, one for a bulk water flow rate and one for dribble water flow rate. Every product granulates (pelletizes) with a certain amount of moisture. For a given set of ingredients (e.g., gypsum and corn starch binder), the amount of water required for granulation may be determined and stored, e.g., in a computer memory accessible by PLC 24. Then, for each batch that is being mixed for pelletization, PLC 24 may automatically compute the difference between the required amount of water for granulation and the amount of water present as measured by moisture meter 3. If too much water is added during the for mixing/pelletization, the material will turn into to a slurry instead of pelletizing properly. If too little water is added, the material may not pelletize properly, either.

In some embodiments, water is added from a water weigh tank that uses a loss in weight based approach to add the water to mixers 9A, 9B. For example, a water weigh tank may be mounted on load cells and may contain more water than the amount of water associated with one mixing batch. When water is called for, the water is released to flow out of the water weigh tank to mixer 9A or 9B. When the correct amount of water is released, the discharge valve shuts and stops the water flow to mixer 9A or 9B. As water flows out, the weight of the water discharged to mixer 9A or 9B is recorded and tracked.

In some embodiments, near the end of the mixing/pelletizing the rotational speed of rotor 9-2 is decreased (e.g., from 90 ft/sec to 30 ft/sec) and the rotational speed of mixing pan 9-1 is increased (e.g., doubled). This phase, which may be referred to as a rolling phase of the mixing/pelletizing operation, changes the movement pattern of material in mixing pan 9-1 and allows the pellets to roll and become more round.

Pellet size is dependent on various factors, including the moisture of the material during the mixing/pelletizing process, the time spent mixing in mixer 9, and the duration of the rolling phase in the cycle to make the pellets round and smooth. In some embodiments, the resulting pellets are less than 0.5 inches in diameter.

A liquid-based binder system 12 provides a binder storage tank, transfer pump, and metering system. The transfer pump sends water and binder to the liquid solution valve panel which regulates and meters flow to mixers 9A, 9B.

A weigh-belt conveyor 13 feeds a dryer/cooler unit 14A. Pelletized material including pellets 23 leaving the table feeders 10A, 10B is discharged onto weigh-belt conveyor 13. Weigh-belt conveyor 13 provides information for balancing the mass flow of product into dryer/cooler unit 14A. Conveyor 13 is VFD regulated and is integrated into the PLC for speed control of the table feeder and this dryer in-feed conveyor.

Dryer/cooler 14A is a vibrating fluid bed dryer/cooler or equivalent system. Dryer/cooler 14A dries the syngyp pellets 23 to less than 1% moisture.

Baghouse dust collector 14B collects fines from the operation of dryer/cooler 14A. Baghouse dust collector 14B is exhausted externally.

At the exit of the cooler section of dryer/cooler 14A, the dried pellets enter a dried pellet conveyor 15A. Conveyor 15A takes the pelletized material to a bucket elevator conveyor 16. To support process interruptions, automatic diverter valve 22 can divert pellets to stock out conveyor 15B, and pellets can be returned to the process flow via stock out return surge bin 21. Bucket elevator conveyor 16 transfers material vertically and then horizontally to a vibrating screen separator 17. Screen separator 17 may be a five-deck heavy-duty two bearing vibrating screen with five selected screen surfaces for product size total of 250 square feet of screening area. More or fewer screens may be used. Quick-change design screens are end-tensioned with spring tensioning devices. The screen or square opening screen unit may be pedestal mounted and complete with sub-base. Long life spherical roller screen bearings on a shaft may be driven by one 10 HP, 230/460 VAC, 60 HZ, 3 PH, TEFC motor with motor mount and guard. Screen separator 17 may also include a feed box with replaceable A-R steel liner, end tensioned screen cloth take-up rails and torque springs.

Oversized material coming from the screening operation is sent to a crumbler 18. Crumbler 18 reduces the oversized material in size so that 100% of it will pass through a 3.0 mm screen. Material processed through crumbler 18 is returned to bucket elevator conveyor 16 for rescreening.

Baghouse dust collector 19 collects fines from the screening operation and miscellaneous dust at various points throughout the system. The collected fines/dust are returned to recycle day bin 6B These fines/dust will then be recycled as a minor material addition to a new material batch for mixing. Collector 19 may be exhausted externally.

Automatic bag filling system 20 includes two in-line bulk bag fill stations separated by an automatic pallet dispenser. The fill stands have automatic bag exiting conveyors which move the bags to powered conveyors, which are capable of staging three 2-ton bulk bags on both sides of the system. The fill stations are designed to minimize action required for the operator to attach and remove the bag straps as bags are replaced in the fill stations. The other duties associated with bag filling system 20 are the removal of the full bags from the staging conveyors and the replenishment of the pallet dispenser.

Figure 7:
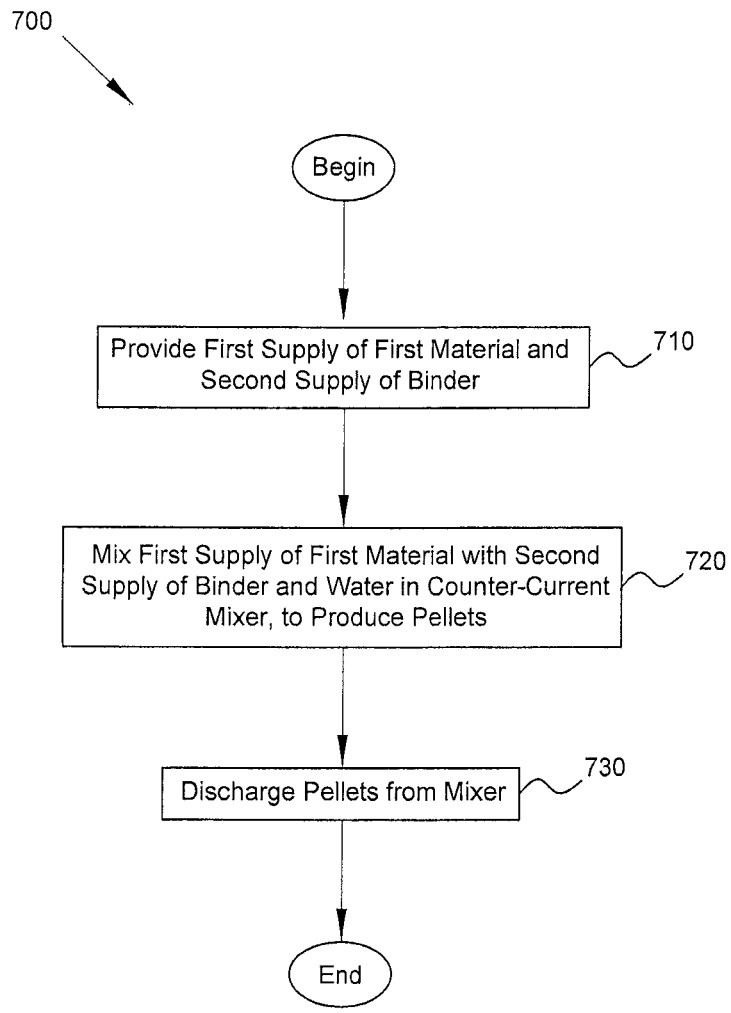
FIG. 7 is a flow diagram of a process in accordance with some embodiments.

FIG. 7 is a flow diagram of a process in accordance with some embodiments. Process 700 is a process for manufacturing pellets. Process 700 includes providing (block 710) a first supply of a first material and a second supply of a binder including a second material in respective storage units. The first supply of the first material is mixed (block 720) in a counter-current mixer with the second supply of the binder and water to produce a plurality of pellets. The mixing occurs simultaneously with pelletizing in the mixer. The plurality of pellets are discharged (block 730) from the mixer.

The apparatuses and processes are not limited to the specific embodiments described herein. In addition, components of each apparatus and each process can be practiced independent and separate from other components and processes described herein.

The previous description of embodiments is provided to enable any person skilled in the art to practice the disclosure. The various modifications to these embodiments will be readily apparent to those skilled in the art, and the generic principles defined herein may be applied to other embodiments without the use of inventive faculty. The present disclosure is not intended to be limited to the embodiments shown herein, but is to be accorded the widest scope consistent with the principles and novel features disclosed herein.

What is claimed is:

1. A process for manufacturing pellets, the process comprising: providing a first supply of a first material and a second supply of a binder including a second material in respective storage units; mixing the first supply of the first material with the second supply of the binder and water to produce a plurality of pellets, wherein the mixing occurs simultaneously with pelletizing in a counter-current mixer; and discharging the plurality of pellets from the mixer.

2. The process of claim 1, wherein the first material includes synthetic gypsum.

3. The process of claim 2, wherein the first material includes wet synthetic gypsum.

4. The process of claim 2, wherein the second material includes corn starch.

5. The process of claim 4, wherein the second supply of the binder has a mass of less than 4% of the mass of the first supply of synthetic gypsum.

6. The process of claim 5, wherein the second supply of the binder has a mass of less than 1% of the mass of the first supply of synthetic gypsum.

7. The process of claim 1, wherein the second material includes cement kiln dust.

8. The process of claim 1, wherein the second material includes lignosulfanate.

9. The process of claim 1, further comprising: measuring a moisture level of the first supply of the first material; automatically determining an amount of water to be added, based on the measured moisture level; and automatically dispensing the determined amount of water for the mixing and pelletizing.

10. The process of claim 1, wherein the counter-current mixer includes: a mixing pan configured to contain the first material, the binder, and the water during the mixing; a mixing rotor configured to mix the first material, the binder, and the water in the mixing pan; and a mixing plow configured to mix a mixture comprising the first material, the binder, and the water at a bottom of the mixing pan during the mixing; wherein the mixing pan surrounds the mixing rotor and the mixing plow, the mixing pan, the mixing rotor, and the mixing plow are each capable of being driven to rotate by respective motors, the mixing pan is configured to rotate in a first rotational direction, and the mixing rotor and the mixing plow are configured to rotate in a second rotational direction.

11. The process of claim 10, wherein the mixing plow is further configured to discharge the plurality of pellets from the mixer after the mixing and pelletizing.

12. The plurality of pellets produced by the process of claim 1.

13. The plurality of pellets of claim 12, wherein the first material includes synthetic gypsum, and the mass of the binder within the pellets is less than 4% of the mass of the synthetic gypsum within the pellets.

14. A pellet comprising synthetic gypsum, corn starch, and water, wherein the pellet is round and the mass of the corn starch in the pellet is less than 4% of the mass of the synthetic gypsum in the pellet.

15. The pellet of claim 14, wherein the pellet has a white color.

16. The pellet of claim 14, wherein the pellet has a diameter less than 0.5 inches.

17. A pelletization system comprising: a first bin containing a first supply of synthetic gypsum; a second bin containing a second supply of a binder including corn starch; a counter-current mixer configured to mix the first supply of synthetic gypsum, the second supply of the binder, and water; and a controller configured to control the flow of water to the mixer.

18. The pelletization system of claim 17, wherein the first supply of synthetic gypsum includes wet synthetic gypsum.

19. The pelletization system of claim 17, further comprising a moisture meter configured to measure a moisture level of the first supply of synthetic gypsum, wherein the controller is configured to control the flow of water to the mixer based on the measured moisture level.

20. The pelletization system of claim 17, wherein the mixer includes: a mixing pan configured to contain the synthetic gypsum, the binder, and water during the mixing; a mixing rotor configured to mix the synthetic gypsum, the binder, and the water in the mixing pan; and a mixing plow configured to mix a mixture comprising the synthetic gypsum, the binder, and the water at a bottom of the mixing pan during the mixing; wherein the mixing pan surrounds the mixing rotor and the mixing plow, the mixing pan, the mixing rotor, and the mixing plow are each driven by a respective motor, the mixing pan is configured to rotate in a first rotational direction, and the mixing rotor and the mixing plow are configured to rotate in a second rotational direction.

* * * * *